United States Patent [19]

Hutter, III

[11] 4,407,431

[45] Oct. 4, 1983

[54] SYSTEM FOR DISPENSING CURABLE COMPOSITIONS

[76] Inventor: Charles G. Hutter, III, 4110 County Line, Carson City, Nev. 89701

[21] Appl. No.: 240,470

[22] Filed: Mar. 4, 1981

[51] Int. Cl.³ .................. B01F 15/02; B67D 5/60
[52] U.S. Cl. .................................. 222/1; 222/135; 222/145; 222/148; 222/318; 141/107; 366/137; 239/113
[58] Field of Search ............... 222/1, 129, 135, 144.5, 222/145, 146 HE, 148, 318, 424; 141/90, 107, 383; 422/110, 114-115, 132-133; 366/136-137, 76-77; 239/112-113; 264/37, 328.6; 137/238, 566

[56] References Cited

U.S. PATENT DOCUMENTS

| | | | |
|---|---|---|---|
| 1,857,084 | 5/1932 | Goetz | 239/113 |
| 3,404,869 | 7/1966 | Harder . | |
| 3,424,439 | 1/1969 | Baker | 366/137 |
| 3,583,678 | 6/1971 | Harder . | |
| 3,627,275 | 12/1971 | Gurmer | 422/133 X |
| 3,799,396 | 3/1974 | Ashmead et al. | 222/1 |
| 3,989,228 | 11/1976 | Morris et al. | 366/76 |
| 4,062,472 | 12/1977 | Taube | 222/148 X |
| 4,073,664 | 2/1978 | Zwirlein | 239/112 X |
| 4,119,110 | 10/1978 | Stone | 222/148 X |
| 4,269,237 | 5/1981 | Berger | 141/383 X |
| 4,302,481 | 11/1981 | Ribnitz et al. | 239/112 X |

Primary Examiner—Charles A. Marmor
Attorney, Agent, or Firm—Fulwider, Patton, Rieber, Lee & Utecht

[57] ABSTRACT

A system is provided for dispensing curable compositions formed by a mixture of first and second materials which, when mixed in prescribed ratio, interact with each other to provide a relatively rapidly curable composition, such as a polymerizable epoxy resin or the like. The materials are individually pumped and metered through a first mixer and a dispensing valve to a dispensing nozzle. During start-up, the dispensing nozzle is closed, and the initial mixed composition is diverted through a bypass valve for dilution and mixture with a diluent stream of the first material in a second mixer and for return of the diluted mixture to the supply reservoir of the first material. When a homogeneous mixture of prescribed ratio is achieved at the outlet of the first mixer, the bypass valve is closed and the dispensing valve can be opened to allow dispensing of the composition. Upon shut-down, supply of the second material to the first mixer is ceased, and the dispensing valve and bypass valve are closed and opened, respectively. The first material is supplied to the first mixer and through the bypass valve to flush the composition therefrom and for dilution of the composition with the diluent stream in the second mixer.

42 Claims, 4 Drawing Figures

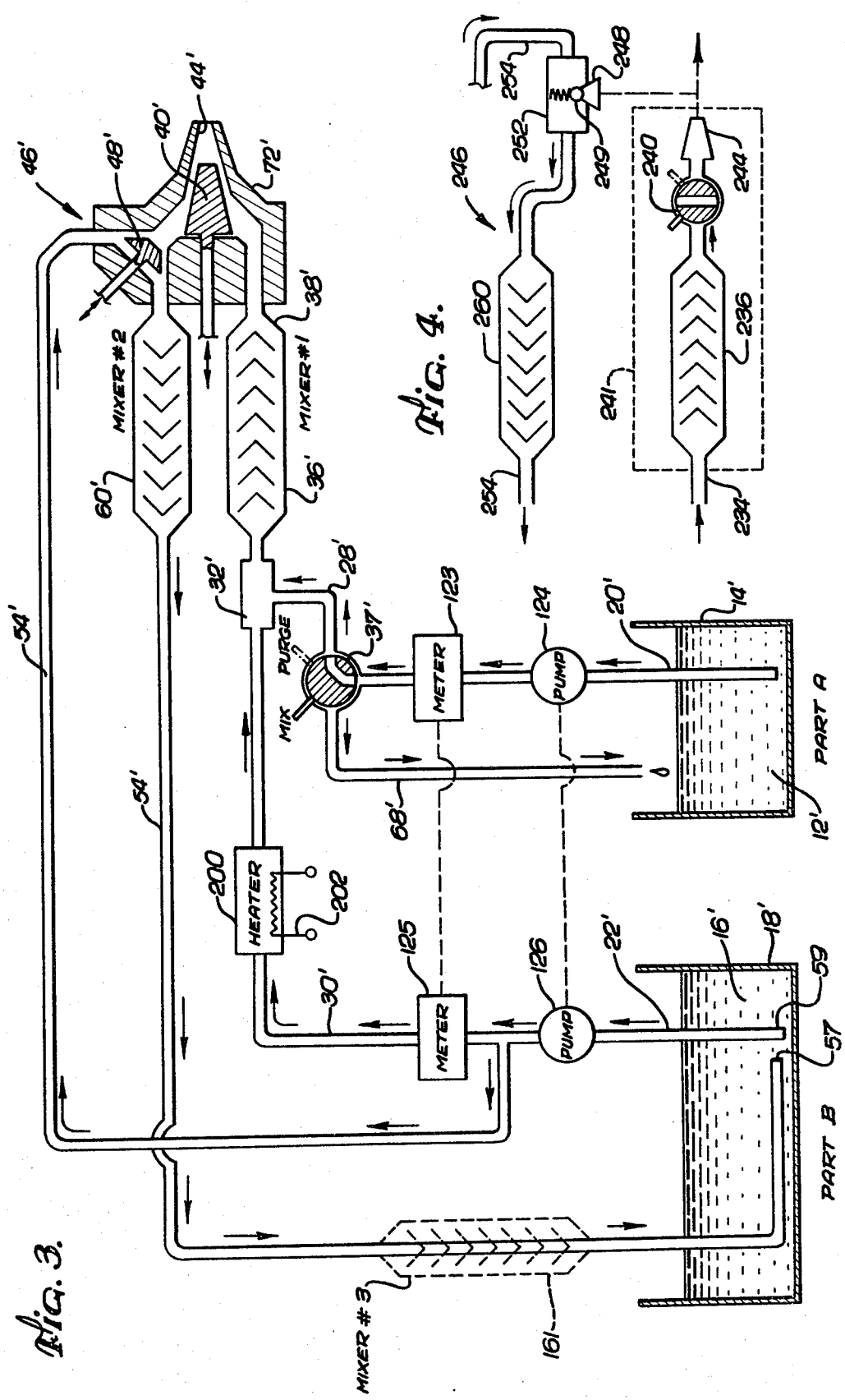

SYSTEM FOR DISPENSING CURABLE COMPOSITIONS

BACKGROUND OF THE INVENTION

This invention relates to dispensing systems for mixing and dispensing multicomponent curable compositions, such as polymerizable epoxy resins formed by a mixture in prescribed ratio of two or more materials such as a base material and an accelerator material. More specifically, this invention relates to apparatus and method for preventing waste of any portion of the composition or material components thereof during start-up, normal operation, or shut down procedures.

Dispensing systems for mixing and dispensing multicomponent curable compositions are well known in the art. Such systems typically include, for example, appropriate pumping mechanisms for pumping and metering separate materials, such as a base material and an accelerator material, in a prescribed ratio to a mixing device where these materials are thoroughly mixed together. When mixed, the two materials interact with each other to create a flowable, curable composition which will set up or harden to a nonflowable state in a relatively short period of time, referred to frequently as the "cure" time. Examples of such compositions are polymerizable resins and the like wherein the base material comprises a substance including unreacted polymers such as a polysulfide resin together with diluting solvents such as toluene for viscosity control, and wherein the accelerator material comprises a polymerization initiator such as an appropriate oxidizer which provides the desired chemical reaction when mixed with the base material. Various other chemical components and combinations of components may be included in either the base material or the accelerator material to adjust resultant physical properties of the mixed composition, and environmental parameters such as temperature can be controlled to increase or decrease cure time, as desired. In any event, the mixed composition must be supplied promptly from the mixing device to an appropriate dispensing nozzle for application to a surface before the composition cures.

Curable compositions of the general type described are used, for example, as adhesives or sealants in a wide variety of industrial applications. The mixed composition is applied from the dispensing system through the dispensing nozzle directly to the surface or point of application where the composition is desired. In a common assembly line type operation, the flow of the mixed composition is necessarily required to be intermittent as the composition is applied to production items in sequence passing along the assembly line, in order to prevent substantial waste of the composition as the dispensing nozzle is moved from one production item to another.

In production-type situations, it is highly desirable for the composition to cure as radidly as possible so that subsequent production operations can be performed without significant time delay. Exemplary methods of substantially decreasing the cure time of the composition are appropriate adjustment of the mixing ratio of the two materials or elevation of the temperature level of the mixed composition. However, when a desirably rapid curing composition is used, the intermittent dispensing nature of the production environment substantially increases the likelihood of the composition reaching a nonflowable cured state before exiting the mixing device or the dispensing nozzle, thereby clogging the system. This clogging problem is significantly compounded by normal production line interruptions resulting from personnel rest periods, parts or product shortages, machine breakages, and the like. Unfortunately, once the system is clogged, it can be unclogged only be time-consuming disassembly and cleaning of the clogged system components.

In the prior art, it is therefore common practice to utilize curable compositions having relatively long cure times, such as twelve to twenty-four hours, to avoid clogging of the composition dispensing system. This practice, however, requires the production items to undergo relatively expensive heating processes to cure the composition if rapid cure times are desired. Alternately, the production items must be stored in a suitable holding zone until complete curing at ambient temperature is achieved, but this latter alternative unnecessarily occupies floor space in an industrial facility which is desirably utilized for more productive purposes.

Some prior art dispensing systems have been proposed to include features for purging mixed composition from the system whenever dispensing of the composition is halted for a period of time sufficient to create clogging difficulties. For example, so-called solvent purge systems are known wherein a suitable solvent is supplied to the mixing device for flow therethrough and further through the dispensing nozzle to flush and wash the composition therefrom. The resultant contaminated solution of solvent and composition is discarded, and additional base material and accelerator material are not supplied to the mixing device until additional composition is required.

Solvent purge systems are disadvantageous in that they require relatively large quantities of relatively expensive solvents, typically petroleum-based solvents such as methylene chloride or the like. This type of solvent, as well as the flushed composition, comprise toxic waste substances which are not easily or inexpensively discarded. Moreover, when the dispensing is subsequently restarted, an initial portion of the mixed composition tend to be "off-ratio" and may include undesirable traces of solvent, thereby requiring this initial portion of the composition also to be wasted until a noncontaminated homogeneous mixture is achieved.

Another purge system proposed in the prior art comprises a so-called base purge system for flushing mixed composition from the mixing device and the dispensing nozzle. In this type of system, the accelerator material flow to the mixing device is ceased whenever purging is required, and the base material flow is continued for a period of time sufficient to flush completely the mixed composition from the mixing device and the dispensing valve. The flushed material which includes a high proportion of base material is discarded, with the unmixed and uncurable base material in the mixing device preventing clogging of the system. See, for example, U.S. Pat. No. 3,989,228.

Base purge systems are also disadvantageous in that the "off-ratio" flush material which is wasted is both expensive and toxic. Moreover, when the system is restarted, the initial mixed composition remains "off-ratio" for a substantial period of time until the unmixed base material is flushed completely from the mixing device and the dispensing nozzle. This undesirably and significantly increases the quantity of expensive waste material which must be properly disposed.

The present invention overcomes the problems and disadvantages of the prior art by providing an improved system for dispensing curable compositions. The system includes apparatus and method for preventing waste of any portion of the component materials while allowing the system to be started up and shut down as frequently as necessary.

SUMMARY OF THE INVENTION

In accordance with the invention, a system is provided for mixing and dispensing a curable composition formed from a plurality of component materials without waste of any portion of those materials. The system comprises pumping and metering means for supplying at least two component materials, such as a base material and an accelerator material, in a predetermined ratio from individual reservoirs to a component mixer which mixes those materials together to form the composition, such as a polymerizable resin. The composition is in turn supplied from the mixer through a dispensing valve which is controllably opened and closed to control flow of the composition through the valve to a dispensing nozzle. According to the invention, the dispensing valve is closed and the composition is bypassed to a dilution circuit during start-up procedures until a homogeneous composition is achieved and during shut-down procedures until mixed composition is flushed from the mixer.

In a preferred form of the invention, upon start-up of the dispensing system, the dispensing valve is closed and a bypass valve is opened to communicate initial mixed composition to the upstream end of a dilution mixer in the dilution circuit. This initial mixed composition is thoroughly mixed with and diluted by a diluent stream comprising a relatively large flow of one of the two component materials, such as the base material, in sufficient proportion to provide a resultant diluted mixture having a sufficiently low amount of the other material to prevent curing for at least a reasonable period of time. The diluted mixture is returned to the reservoir of the diluent stream until sufficient elapse of time to assure a homogeneous mixture at the outlet of the component mixture, at which time the bypass valve is closed and the dispensing valve can be opened on demand to allow dispensing of the composition.

When it is desired to shut down the system, the bypass valve is opened once again and the dispensing valve is closed. At the same time, a selector valve switches the flow of the other component material, typically the accelerator material, for direct return to its reservoir without passage to the component mixer. Supply of the one component material, typically the base material is continued to fill the component mixer and to flush mixed composition from the component mixer through the bypass valve and into the dilution circuit for appropriate dilution of the composition in the dilution mixer and return of the diluted mixture to the appropriate reservoir. Upon elapse of sufficient time for complete flushing of the component mixer, the operating pumps and the like in the system are shut down until restart is desired.

Upon restarting, the dispensing valve is closed and the bypass valve is opened so that the initial component mixture, inclusive of unmixed component material in the component mixer from the preceding flushing step is bypassed to the dilution circuit for dilution. The positions of the dispensing and bypass valves are reversed when the mixed composition at the outlet of the component mixture is homogeneous to allow the mixed composition to be dispensed through the dispensing nozzle.

Other features and advantages of the present invention will become apparent from the following detailed description, taken in conjunction with the accompany drawings which illustrate, by way of example, the principles of the invention.

BRIEF DESCRIPTION OF THE DRAWINGS

The accompanying drawings illustrate the invention. In such drawings:

FIG. 3 is a schematic diagram illustrating an alternative embodiment of the invention.

FIG. 4 is a portion of a schematic diagram illustrating another alternative embodiment of the invention.

DETAILED DESCRIPTION OF THE PREFERRED EMBODIMENT

Figure 1:
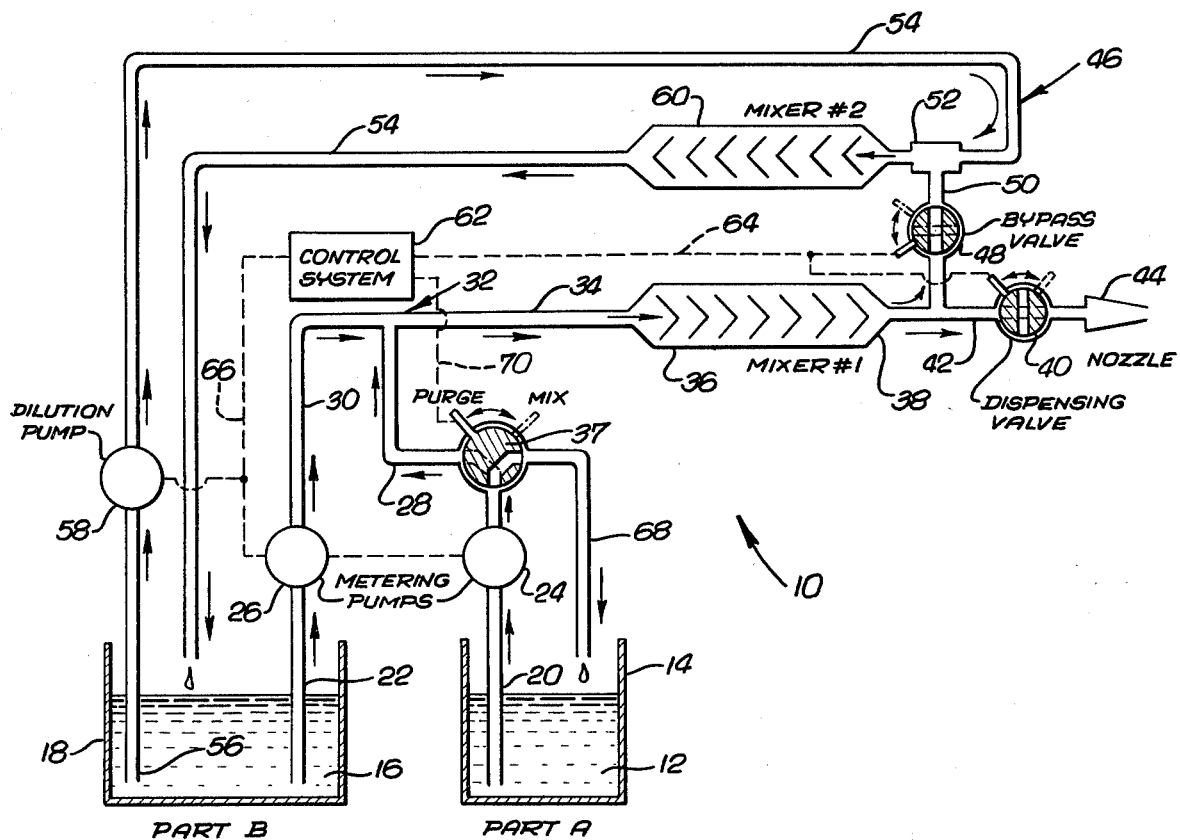
FIG. 1 is a schematic diagram illustrating a dispensing system embodying the novel features of this invention.

As shown in the examplary drawings, a dispensing system 10 is provided for mixing and dispensing a curable composition. The composition is formed by mixture of two or more component materials, with two component materials being shown in the drawings and identified as "Part A" and "Part B". The component materials comprise flowable noncurable substances which, when mixed in specified proportion, interact with each other to form the curable composition in flowable state which will set up or harden to a nonflowable or cured state in a relatively short period of time. The dispensing system 10 of this invention is designed for mixing and handling of component materials and the resultant mixed composition without waste of any portion thereof during start-up or shut-down operating procedures.

The mixed composition comprises, in many typical applications, a polymerizable resin or the like wherein the component material "Part B" comprises a base material substance including unreacted polymers such as a polysulfide resin. A solvent, such as toluene, is frequently included as part of the base material for viscosity control. The other component material "Part A" typically comprises an agent for chemically initiating polymerization, such as an appropriate oxidizer, when the accelerator material is mixed with the base material. Importantly, both the base material and the accelerator material can be formed from a wide variety of chemical substances, and may include various combinations of ingredients to yield a precise set of physical parameters, such as cure time, stiffness, bond strength, etc., all in a well-known manner. For sake of convenience and ease of description, however, the term "accelerator material" will be used herein to refer to the material "Part A" and the term "base material" will be used herein to refer to the material "Part B". It is to be understood that the terms "accelerator material" and "base material" are not intended to limit the scope of the invention, but are intended to refer to two flowable substances which, when combined, interact to produce a curable composition.

As illustrated in FIG. 1, the accelerator material 12 is stored in a reservoir 14 and the base material 16 is stored in a separate reservoir 18. Typically, both reservoirs 14 and 18 comprise drums or barrels in which the materials are normally shipped. A pair of metering pumps 24 and 26 are provided in respective association with the reservoirs 14 and 18, by means of respective pump inlet conduits 20 and 22, for drawing and pumping metered quantities of the accelerator and base materials from the reservoirs. The specific construction and operation of these metering pumps 24 and 26 is believed to be well understood in the art.

The two metering pumps 24 and 26 supply the accelerator and base materials through respective pump outlet conduits 28 and 30 to a mixing junction 32 where the component materials are mixed together in a predetermined ratio for flow through an appropriate flow path 34 to a component mixer 36. The pump outlet conduit 28 through which the accelerator material flows is interrupted by a selector valve 37 which, when in the dotted line position shown in FIG. 1, permits accelerator material flow to the mixing junction 32. For many polymerizable resins, the mixing ratio is on the order of about ten parts base material to about one part accelerator material by volume.

The component mixer 36 comprises any suitable mixing apparatus for thorough mixing of the component materials into a homogeneous mixture of prescribed ratio to form the curable composition. While no specific mixer construction is shown or contemplated, a so-called static mixer of the type described in U.S. Pat. Nos. 3,404,869 and 3,583,678 is preferred. Such a static mixer includes a plurality of internal flow paths without moving parts designed for dividing and reuniting the material pumped therethrough by the metering pumps 24 and 26 so that the resultant composition exiting the downstream end 38 of the mixer 36 is homogeneously mixed.

A dispensing valve 40 is positioned at the downstream end 38 of the component mixer 36 to open and close a flow path 42 through a dispensing nozzle 44. When the dispensing valve 40 is in the dotted line position shown in FIG. 1, the flow path 42 is open and the mixed composition is free to flow outwardly from the dispensing nozzle 44. In a typical operating environment, the dispensing valve 40 is manually opened and closed by means of a trigger switch (not shown) or the like, and at least the dispensing nozzle 44 is mounted at the free end of a flexible conduit to allow the mixed composition flow to be applied to the specific application surface desired.

When the system is started up, the two metering pumps 24 and 26 are driven appropriately to supply the accelerator material 12 and the base material 16 in the prescribed ratio to the component mixer 36. It has been found, however, that the initial portions of the mixed material from the mixer 36 may not be precisely the desired homogeneous composition of prescribed ratio since the materials commonly do not achieve equilibrium flow for mixing through the mixer 36 until after passage of a relatively short initial mixing period. Moreover, initial portions of mixed composition may include high proportions of one of the two materials remaining in the mixer from prior flushing steps, as will be described. In any event, this initial "off-ratio" or insufficiently mixed composition is not wasted, but is bypassed to a dilution circuit 46.

More specifically, upon start-up of the system 10, the dispensing valve 40 is closed, as shown by the solid line position in FIG. 1, and a bypass valve 48 is opened (also shown by the solid line position in FIG. 1) to open a bypass flow path 50 leading from the downstream end 38 of the mixer 36 to the dilution circuit 46. The initial "off-ratio" or insufficiently mixed composition is thus supplied through the bypass flow path 50 to a mixing junction 52 wherein this material is diluted by mixture with a diluent stream flowing through a dilution circuit conduit 54.

The dilution circuit conduit 54 has an inlet end 56 received into the base material reservoir 18, and a dilution circuit metering pump 58 draws a metered quantity of the base material 16 from the reservoir for supply through the conduit 54 to the mixing junction 52. Preferably, the quantitative flow rate of base material through the dilution circuit conduit 54 is substantially greater than the total flow through the bypass flow path 50 so that the total proportionate concentration of accelerator material at the mixing junction 52 is relatively low. It is important that this proportionate concentration of acceleration material at the mixing junction be sufficiently low to preclude curing of the diluted mixture within a reasonable period of time, say on the order of at least about a few hours.

The total flow of diluent base material and mixed composition is supplied to a dilution mixer 60, which also preferably comprises a static mixer of the general type disclosed in U.S. Pat. Nos. 3,404,689 and 3,583,678. This static mixer thoroughly mixes the materials passing therethrough into a homogeneous mixture, and discharges that homogeneous mixture through a return portion of the dilution circuit conduit 54 to the base material reservoir 18.

In a typical operating example of the system 10, the base material 16 and the accelerator material 12 are mixed together in a ratio of about 10:1 to form the curable composition. The initial "off-ratio" or insufficiently mixed portion of the composition is bypassed to the dilution circuit 46 for mixture with the diluent stream of unmixed base material 16. This diluent stream is provided to the mixing junction 52 in a ratio of about 10:1 with respect to the bypassed material, whereby the diluted mixture returned to the base material reservoir 18 has a base/accelerator material ratio of about 100:1. For a majority of system environments, this relatively miniscule contamination of the base material in the reservoir 18 is insufficient to cause any curing within the reservoir 18 during a reasonable residence period of several days, and moreover, the contamination is insufficient to affect adversely the characteristics of subsequent mixed composition supplied through the dispensing nozzle 44 even though the base material for that subsequent composition includes a small amount of accelerator material.

In normal use, the dispensing valve 40 is maintained closed and the bypass valve 48 is held open during start-up procedures for a time period sufficient to allow the composition at the downstream end 38 of the mixer 36 to achieve or reach satisfactory physical characteristics, namely, a homogeneous mixture of the prescribed ratio. After this time period has elapsed, the bypass valve 48 is closed and the dispensing valve 40 can then be opened or closed as desired to dispense the composition through the dispensing nozzle 44. This operation of the valves 40 and 48 can be accomplished manually after expiration of the appropriate time period, or automatically by means of a control system 62 including suitable timing devices (not shown) and control circuits 64 coupled to the valves for positional control thereof. This control system 62 can also be coupled by appropriate circuits 66 to the metering pumps 24, 26, and 58 for controlling the on-off state of those pumps. Conveniently, the details of the suitable control system 62 including the necessary timing devices and means for signalling and operating the valves and the metering pumps in response thereto are believed to be well known to those skilled in the art.

When it is necessary to maintain the dispensing valve 40 in a closed position for a period of time wherein curing of the composition within any portion of the system is possible, the mixed composition must be flushed or purged from the component mixer 36, the flow path 42, the dispensing valve 40, and the dispensing nozzle 44. For this flushing step, the dispensing valve 40 is maintained closed and the bypass valve 48 is opened. At the same time, the selector valve 37 along the outlet conduit 28 from the pump 24 is moved to a purge or flush position as illustrated by the solid lines in FIG. 1 to return the accelerator material 12 to the reservoir 14 via a return conduit 68. If desired, this control of the selector valve 37 can also be provided automatically by the control system 62 via a control circuit 70 coupled to the valve 37.

In this condition of operation, the base material supplied by the metering pump 26 continues to flow to the component mixer 36 to flush the mixed composition through the bypass valve 48 to the dilution circuit 46. There, the bypassed composition is joined with the diluent stream at the mixing junction 52, and the total flow is supplied to the dilution mixer 60 for thorough mixing of the material and resultant alteration of the proportionate concentration of the accelerator material to a low, insignificant level. This level of accelerator material concentration is at a maximum upon initiation of flushing and steadily decreases until sufficient time has elapsed for all the mixed composition to be removed from the component mixer 36. Importantly, relative proportions of the materials flowing through the dilution mixer 60 are chosen such that the cure time of the diluted mixture is acceptably long at the outset of flushing operation. This diluted mixture is returned to the base material reservoir 18, and after sufficient elapse of time, the various metering pumps are shut down either manually or by the control system 62 to place the dispensing system 10 in a shut down condition. While shut down, the component mixer 36 is filled with base material 16 which, in the absence of any significant proportion of accelerator material, will not cure for a reasonable period of time.

Upon restarting the dispensing system, the metering pumps 24 and 26 are activated to supply accelerator and base material in the specified proportion to the component mixer 36. These materials flush the unmixed base material or "off-ratio" material from the mixer into the dilution circuit 46 for mixture with the diluent stream pumped by the metering pump 58. This operating condition is maintained for a sufficient period of time until the composition at the downstream end 38 of the component mixer 36 reaches a physical state comprising a homogeneous mixture having the desired proportions of base and accelerator materials. When this occurs, the bypass valve 48 is closed and the dispensing valve 40 can be opened and closed as needed to dispense mixed composition through the nozzle 44.

The dispensing system 10 of this invention provides a highly advantageous system in that base and accelerator materials are homogeneously mixed together and supplied in specified proportion through a dispensing nozzle without waste of any portion of the material at any time. The system effectively bypasses "off-ratio" of insufficiently mixed portions of the material during start-up or restart procedures wherein that bypassed material is saved without curing for later use. Similarly, during shut-down procedures, the curable composition is flushed from the system without any waste by alteration of the proportional concentrations of the materials therein and by saving this altered concentration material without curing for later use.

Figure 2:
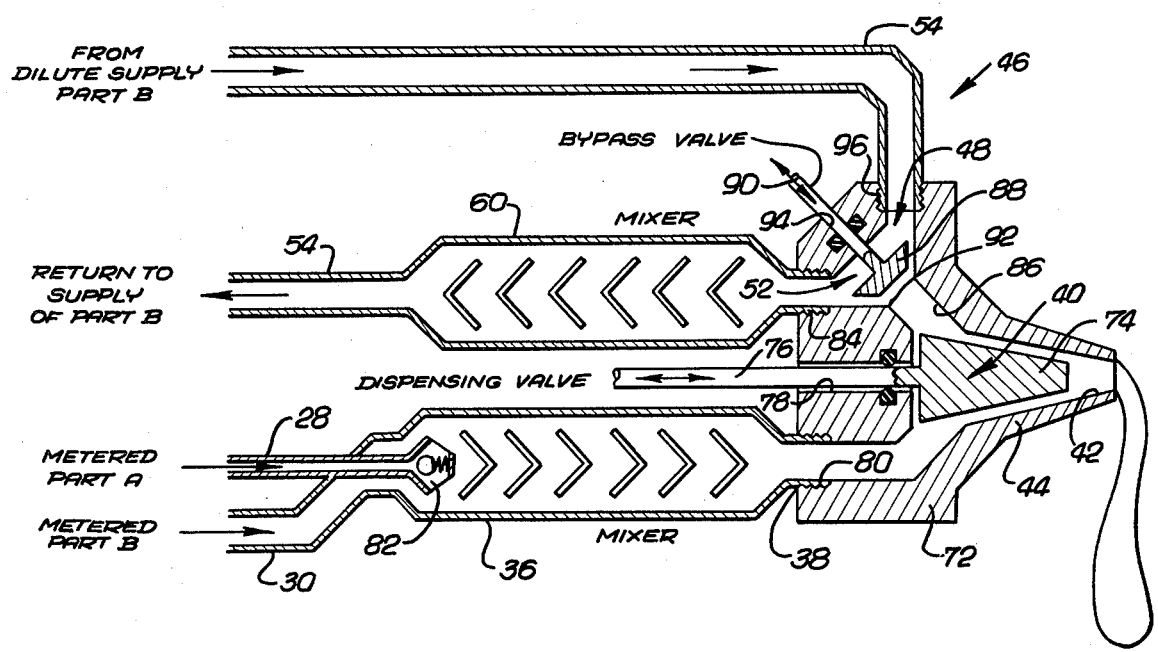
FIG. 2 is an enlarged fragmented sectional view, somewhat in schematic form, illustrating a portion of the system of this invention.

One preferred arrangement of a portion of the dispensing system 10 is shown in more detail in FIG. 2. As shown, the dispensing nozzle 44 is formed in a valve block 72 including the composition flow path 42 as a tapered converging passage opening from the interior of the valve block 72 to atmosphere. The dispensing valve 40 is embodied in a matingly tapered valve head 74 carried by a valve stem 76 received through a sealed stem opening 78 for connection to appropriate actuation means (not shown). The valve head 74 is movable along the axis of the valve stem 76 to an open position retracted from the dispensing nozzle 44, as shown in FIG. 2, and a closed position seated upon the tapered inside surface of the nozzle 44. This provides a dispensing valve construction with substantially zero residual volume when closed to prevent entrapment of any portion of the curable composition in the area of the closed dispensing valve 40.

The valve block 72 includes an inlet port 80 for connection to the downstream end 38 of the component mixer 36. This mixer 36 is supplied with the base material by the pump outlet conduit 30 connected in-line with the upstream end of the mixer, and the accelerator material is supplied to the mixer coaxially within the conduit 30 by the other pump outlet conduit 28. Conveniently, as illustrated, the downstream end of this latter conduit 28 includes a ball valve assembly 82 or the like to prevent backflow of any material thereinto.

An outlet port 84 is formed in the valve block 72 for connection to the upstream end of the dilution mixer 60 of dilution circuit 46. This outlet port 84 is in communication with the inlet port 80 via an internal valve block flow passage 86 which also communicates with the dispensing nozzle 44. Accordingly, when the dispensing valve 40 is open, an open flow path is defined for discharge of mixed composition from the component mixer 36 through a portion of the flow passage 86 and the dispensing nozzle 44 to atmosphere. However, when the dispensing valve 40 is closed, the composition or material from the mixer 36 is confined to the flow passage 86.

The bypass valve 48 comprises a poppet valve head 88 for engagement with a valve seat 92 along the length of the valve block flow passage 86 downstream of the dispensing valve 40. This valve head 88 is carried by a valve stem 90 which projects outwardly from the valve block 72 through a sealed opening 94 for connection to suitable actuation means (not shown). The bypass valve head 88, when in the open position as shown in FIG. 2, permits flow of the composition in the flow passage 86 into the dilution mixer 60. Of course, when the bypass valve head is closed, flow of the composition from the component mixer 36 into the dilution mixer 60 is prevented.

A second inlet port 96 is formed in the valve block 72 adjacent the outlet port 84. This second inlet port 96 is connected to the dilution circuit conduit 54 through which the diluent stream of base material is supplied by the pump 58 (FIG. 1). This inlet port 96 intersects with the internal flow passage 86 at a position immediately downstream of the valve seat 92 and the bypass valve head 88. Thus, the diluent stream flows freely into the dilution mixer 60 regardless of whether the bypass valve 48 is open or closed, with the intersection between the inlet port 96 and the flow passage 86 defining the mixing junction 52.

The valve body arrangement shown in FIG. 2 advantageously provides a short flow path between the downstream end 38 of the component mixer 36 and the dispensing nozzle 44. Moreover, a short flow path is provided between the dispensing valve 40 and the bypass valve 48 so that very little residual material can become trapped between the two valves when the bypass valve 48 is closed and the dispensing valve 40 is opened. Further, when the bypass valve 48 is opened and the dispensing valve 40 is closed, the entire flow passage 86 between the inlet and outlet ports 80 and 84 is relatively short in length and swept substantially completely by the material flowing therethrough. Thus, during flushing, mixed composition is swept completely through the short flow passage 86 to the closely adjacent mixing junction 52, and this composition is in turn swept completely by the diluent stream flowing from the second inlet point 96 to the outlet port 84.

The entire valve body arrangement of FIG. 2 including the mixers 36 and 60 can be incorporated into a unitary head assembly which is relatively small in size and light in weight. This provides a system wherein minimal volumes of material are required for the various start-up and shut-down procedures, and wherein the resultant head assembly is easily directed to the desired point of application by the operator.

An alternative embodiment of the invention is shown in FIG. 3 to illustrate various improvements which can be incorporated into the system. For sake of convenience, the embodiment of FIG. 3 includes primed reference numerals to refer to structural components common to those shown and described in FIGS. 1 and 2. As illustrated, accelerator and base materials 12' and 16' are drawn respectively from reservoirs 14' and 18' through conduits 20' and 22' by a pair of pumps 124 and 126. These pumps 124 and 126 supply the materials respectively through appropriate meters 123 and 125 and outlet conduits 28' and 30' to a mixing junction 32' and further to a component mixer 36'. As in the prior embodiment, a selector valve 37' is operable to couple the accelerator material to the mixing junction 32' when in the solid line position shown in FIG. 3, and to return the accelerator material to the reservoir 14' via a return conduit 68' when the valve 37' is in the dotted line position.

A heater 200 is coupled along the base material outlet conduit 30' for selective elevation of the temperature level of the base material prior to supply thereof to the component mixer 36'. This heater 200 includes appropriate heat input means, such as an electrical resistance circuit 202. Accordingly, the resultant curable composition exiting the downstream end 38' of the mixer 36' is substantially elevated in temperatuere for the purpose of substantially reducing the cure time of the composition. For example, in a polymerizable resin having a curing time of about twenty-four hours at room temperature, elevating the temperature level of the resin to about 90° C. results in a resin which becomes tack-free in about five minutes and totally cured in about three hours.

The heated, mixed composition is supplied through a valve block 72' to a dispensing valve 40', and further through a dispensing nozzle 44' when the valve 40' is open. During start-up or restarting, however, the initial portions of the composition may not be homogeneously mixed and/or "off-ratio", whereby the dispensing valve 44' is held closed and these initial portions are bypassed through an open bypass valve 48' to a dilution circuit 46'.

The dilution circuit 46' includes a conduit 54' which, in this embodiment, can be conveniently coupled to the downstream end of the base material pump 126 at a position upstream of the meter 125. The base material diluent stream is provided in appropriate proportion to dilute the bypassed material to an extent that the diluted mixture will not cure within a reasonable period of time. Importantly, this diluted mixture is substantially reduced in temperature by the unheated diluent stream to reduce the tendency of the mixture to cure, and the cooled mixture is supplied to a dilution mixer 60' for thorough homogeneous mixing.

The cooled, diluted mixture is recycled to the base material reservoir 18' through the remaining portion of the conduit 54'. As illustrated, this portion of the conduit 54' can include a third mixer 161 such as an additional static mixer near the reservoir 18' to mix the materials once again and thereby overcome any tendency of the accelerator material to reconcentrate in localized areas of the diluent mixture. Moreover, the outlet end 57 of the conduit 54' terminates in a position within the reservoir 18' such that the recycled diluted mixture is deposited near the inlet end 59 of the pump inlet conduit 22'. With this arrangement, the partially contaminated mixture has a relatively short residence time in the reservoir 18' since it tends to be first withdrawn from the reservoir upon restart of operation.

Operation of the system of FIG. 3 is generally identical to that of the system shown and described in FIG. 1. Component materials are recycled and diluted during start-up, restart, or flushing to prevent any waste of those materials. The system is capable of handling heated composition with extremely short cure times, since it can be repeatedly shut down and flushed and then restarted as necessary. Any heated composition which is "off-ratio" or insufficiently mixed is both cooled and diluted to prevent curing thereof without waste. If desired, the various components in the system of FIG. 3 can be automatically controlled by an appropriate control system of the type described with respect to FIG. 1.

Another alternative embodiment of the invention is illustrated in FIG. 4 to show a simplified arrangement for selective bypassing of mixed composition to a diluting circuit. More specifically, a component mixer 236 which can be identical to the mixer 36 in FIG. 1 is supplied with metered quantities of base material and accelerator material via an inlet conduit 234 which conveniently is formed by a flexible hose or the like. This mixer 236 thoroughly mixes the two materials for supply through a dispensing valve 240 which, in the dotted line position of FIG. 4, allows passage of the composition to and through a dispensing nozzle 244 for selective dispensing of the composition.

In the embodiment of FIG. 4, the mixer 236, the dispensing valve 240, and the dispensing nozzle 244 can be incorporated into a single lightweight dispensing head 241 which is easily moved to the desired point of application for dispensing of the composition. This allows the remaining components of the system such as material reservoirs, pumps, and the like to be installed on a main support frame or the like (not shown) separate from the mobile dispensing head. However, whenever the composition passing through the mixer 236 is not satisfactorily homogeneous or is "off-ratio", or whenever it is desired to flush mixed composition from the system, the composition is quickly and easily diluted by mixing with a substantial quantity of the base material, in generally the same manner as described with respect to FIGS. 1-3. However, in the embodiment of FIG. 4, the dispensing nozzle 244 is adapted for releasable connection to a dilution circuit 246 so that components of the dilution circuit can also be installed upon a main support frame separate from the dispensing head.

More specifically, the dispensing nozzle 244 is adapted for insertion into and releasable connection with a suitable quick release coupling 248 which, when coupled with the nozzle 244, opens a spring loaded ball valve 249 to couple the composition to a mixing junction 252. This mixing junction 252 is also supplied with the diluent stream of the base material by another conduit 254 through which the base material is supplied in the same manner as that described with respect to the conduit 54 and mixing junction 52 in FIG. 1. The resultant mixed composition is supplied to and thoroughly mixed in a dilution mixer 260 for return through another portion of the conduit 254 to the reservoir of the base material. Conveniently, this diluent stream of the base material flows through the mixing junction in a manner to sweep the volume surrounding the ball valve 249 and thereby prevent any portion of the composition from becoming trapped by the ball valve.

In operation, the base and accelerator materials are mixed homogeneously in prescribed ratio for supply through the dispensing valve 240 and nozzle 244 to an appropriate point of application. When it is desired to flush the composition from the system, the dispensing nozzle 244 is coupled to the quick-release coupling 248 of the dilution circit 246, and the dispensing valve is moved to the open position. At this time, the supply of the accelerator material to the mixer 236 is halted and the supply of the base material is continued to flush the mixed composition into the dilution circuit 246 for dilution with base material.

When it is desired to restart the system, the base and accelerator materials are resupplied to the component mixer 236 to flush the unmixed base material therefrom. Until the composition exiting the dispensing nozzle 244 becomes homogeneous and has the prescribed ratio of component materials, the dispensing nozzle 244 is left connected with the dilution circuit to bypass the unsatisfactory or "off-ratio" composition for dilution. After elapse of sufficient time for the mixture to reach the desired state, the dispensing valve 240 is closed and the nozzle 244 is uncoupled from the quick-release coupling 248, whereupon the system is ready for dispensing of composition in a normal manner by operation of the dispensing valve.

A variety of modifications and improvements to the invention described herein are believed to be apparent to one skilled in the art. Accordingly, no limitation upon the invention is intended by way of the description herein, except as set forth in the appended claims.

What is claimed is:

1. A method of dispensing a curable composition formed by a mixture of first and second materials, comprising the steps of:

controllably supplying the first and second materials from respective reservoirs to a first mixing device for mixture thereof to form the composition;

dispensing the composition from the first mixing device in a first condition of operation through a dispensing nozzle;

supplying the composition in a second condition of operation to a second mixing device;

supplying a diluent stream of the first material during the second condition of operation to the second mixing device in sufficient quantity for mixture therein with the composition to form a diluted mixture having a concentration level of the second material sufficiently low to prevent curing of the diluted mixture for a substantial period of time; and returning the diluted mixture to the reservoir of the first material.

2. The method of claim 1 wherein said step of controllably supplying the first and second materials to the first mixing device comprises halting supply of the second material during the second condition of operation, and continuing supply of the first material to flush the composition from the first mixing device to the second mixing device for mixture with the diluent stream.

3. The method of claim 1 wherein said returning step comprises returning the diluted mixture to a region of the first reservoir for prompt removal thereof to the first mixing device.

4. The method of claim 1 wherein said step of controllably supplying the first and second materials comprises supplying these materials to the first mixing device in a prescribed ratio.

5. The method of claim 4 wherein said step of supplying a diluent stream comprises supplying the first material to the second mixing device in a prescribed ratio with respect to the composition.

6. The method of claim 1 including the steps of heating at least one of the first and second materials supplied to the first mixing device to form the composition to have an elevated temperature, and maintaining the diluent stream at a temperature substantially below the elevated temperature to provide the diluted mixture having a temperature substantially lower than the elevated temperature.

7. The method of claim 1 including the step of further mixing the diluted mixture in a third mixing device positioned closely adjacent the reservoir of the first material.

8. A method of dispensing a curable composition formed by a mixture of first and second materials, comprising the steps of:

supplying the first material from a first reservoir to a component mixer;

supplying the second material from a second reservoir during one condition of operation to the component mixer for mixture with the first material to form the composition;

dispensing the composition from the component mixer through a dispensing nozzle when the composition has a desired set of physical characteristics;

supplying the composition to a dilution mixer during a second condition of operation and during conditions wherein the composition lacks said desired set of physical characteristics;

supplying a diluent stream of first material during said second condition of operation to the dilution mixer in sufficient quantity for mixture therein with the composition supplied thereto to form a diluted mixture having a concentration level of the second material sufficiently low to prevent curing of the diluted mixture for at least a substantial period of time; and returning the diluted mixture to the first reservoir.

9. The method of claim 8 wherein said steps of supplying the first and second materials to the component mixer comprise pumping and metering the materials in prescribed ratio to the component mixer, and including the step of returning the second material to the second reservoir during the second condition of operation.

10. The method of claim 8 wherein said returning step comprises returning the diluted mixture to a position within the first reservoir for relatively prompt withdrawl therefrom by said step of supplying the first material to the component mixer.

11. The method of claim 8 wherein said step of supplying the diluent stream comprises supplying the first material to the dilution mixer at a predetermined flow rate with respect to the flow rate of composition supplied to the second mixer.

12. The method of claim 8 including the steps of heating at least one of the first and second materials supplied to the component mixer to provide the composition at an elevated temperature, and maintaining the temperature level of the diluent stream substantially below the elevated temperature.

13. The method of claim 8 including the step of further mixing the diluted mixture downstream of the dilution mixer.

14. A method of dispensing a curable composition formed by a mixture of first and second materials, comprising the steps of:
supplying the first material from a first reservoir to a component mixer;
selectively supplying the second material from a second reservoir to the component mixer for mixture with the first material to form the composition;
supplying the composition to a dilution mixer during an initial period of operation for mixture of the composition with first material in sufficient quantity to form a diluted mixture having a concentration level of the second material sufficiently low to prevent curing of the diluted mixture for a substantial period of time;
dispensing the composition from the component mixer through a dispensing nozzle after said initial period of opertion; and
selectively flushing the composition from the component mixer during a third condition of operation by stopping supply of the second material to the component mixer, and by supplying the composition in the component mixer and the first material supplied to the component mixer to the dilution mixer for dilution with first material in sufficient quantity to form a diluted mixture having a concentration level of the second material sufficiently low to prevent curing of the diluted mixture for a substantial period of time.

15. The method of claim 14 including the step of selectively opening and closing a dispensing valve to control dispensing of the composition substantially homogeneous mixture, and wherein said flushing step is effected whenever the dispensing valve is to be maintained closed for a period of time sufficient to allow any portion of the mixed composition to cure prior to dispensing.

16. A method of dispensing a curable composition formed by a mixture of first and second materials, comprising the steps of:
supplying the first and second materials from respective reservoirs in prescribed ratio to a component mixer for mixture thereof to form the composition;
supplying the composition to a dilution mixer for a period of time sufficient to allow the composition flowing through the component mixer to reach a substantially homogeneous state of said prescribed ratio;
supplying a diluent stream of first material to the dilution mixer in sufficient quantity to form a diluted mixture having a concentration level of the second material sufficiently low to prevent curing thereof for a substantial period of time;
returning the diluted mixture to the first material reservoir;
selectively dispensing the composition from the component mixer through a dispensing valve after the composition flowing through the mixer reaches a substantially homogeneous state of prescribed ratio; and
selectively flushing the composition from the component mixer by stopping supply of the second material to the component mixer, continuing supply of the first material to the component mixer, and supplying the composition in the component mixer and the first material supplied to the component mixer to the dilution mixer for dilution with first material in sufficient quantity to form a diluted mixture having a sufficiently low concentration level of second material to prevent curing of the diluted mixture for a substantial period of time.

17. A method of dispensing a curable composition formed by a mixture of first and second materials, comprising the steps of:
supplying the first and second materials from respective reservoirs in prescribed ratio to a component mixer for mixture thereof to form the composition;
supplying the composition to a dilution mixer for a period of time sufficient to allow the composition flowing through the component mixer to reach a substantially homogeneous state of said prescribed ratio;
supplying a diluent stream of first material to the dilution mixer in sufficient quantity to form a diluted mixture having a concentration level of the second material sufficiently low to prevent curing thereof for a substantial period of time;
returning the diluted mixture to the first material reservoir; and
selectively dispensing the composition from the component mixer after the composition flowing through the mixer reaches a substantially homogeneous state of said prescribed ratio.

18. A method of dispensing a curable composition formed by a mixture of first and second materials, comprising the steps of:
supplying the first and second materials from respective reservoirs in prescribed ratio to a component mixer for mixture thereof to form the composition;
selectively dispensing the composition from the component mixer after the composition flowing through the mixer reaches a substantially homogeneous state of said prescribed ratio;
selectively flushing the composition from the component mixer by stopping supply of the second material to the component mixer, continuing supply of the first material to the component mixer, and supplying the composition in the component mixer and the first material supplied to the component mixer to a dilution mixer; and supplying a diluent stream of first material to the dilution mixer in sufficient quantity to form a diluted mixture having a concentration level of the second material sufficiently low to prevent curing thereof for a substantial period of time and returning the diluted mixture to the reservoir of the first material.

19. A system for dispensing a curable composition formed by a mixture of first and second materials, comprising:
- a first mixing device;
- means for supplying the first and second materials from respective reservoirs to said first mixing device for mixture therein to form the composition;
- means for selectively coupling the composition for flow from said first mixing device to a dispensing nozzle for dispensing of the composition;
- a second mixing device;
- means for selectively supplying the composition to said second mixing device;
- means for supplying a diluent stream of the first material to said second mixing device in sufficient quantity for mixture therein with the composition supplied thereto to form a diluted mixture having a sufficiently low concentration level of the second material to prevent curing of the diluted mixture for a substantial period of time and
- means for returning the diluted mixture to said reservoir for the first material.

20. The system of claim 19 including means for halting the supply of the second material to said first mixing device during at least some operating conditions when the composition is supplied to said second mixing device.

21. The system of claim 19 wherein said means for supplying the first and second materials includes means for metering the materials in a prescribed ratio, and wherein said means for supplying said diluent stream includes means for metering said stream at a prescribed flow rate with respect to the flow rate of the composition supplied to said second mixing device.

22. The system of claim 19 wherein said first mixing device comprises a static mixer.

23. The system of claim 19 wherein said second mixing device comprises a static mixer.

24. The system of claim 19 including means for heating at least one of the first and second materials supplied to said first mixing device.

25. The system of claim 19 wherein said dispensing nozzle, said first mixing device, and said second mixing device are all disposed closely adjacent each other, and including a third mixing device for additional mixing of the diluted mixture at a position adjacent said first material reservoir prior to return of the diluted mixture to said first material reservoir.

26. The system of claim 19 wherein said means for selectively coupling the composition from said first mixing device to said dispensing nozzle comprises a selectively controllable dispensing valve.

27. The system of claim 26 wherein said dispensing valve comprises a valve having substantially zero residual volume when closed.

28. The system of claim 19 wherein said means for selectively supplying the composition to said second mixing device includes a bypass valve selectively controllable for opening and closing passage of the composition to said second mixing device.

29. The system of claim 19 wherein said means for selectively supplying the composition to said second mixing device includes a coupling member for releasable connection to said dispensing nozzle.

30. The system of claim 29 wherein said diluent stream is supplied to said coupling member, said coupling member including a valve movable to an open position to allow supply of the composition into said coupling member when said dispensing nozzle is connected thereto, wherein the volume about said valve when open is swept by said diluent stream, and including means for supplying the composition and the diluent stream from said coupling member to said second mixing device.

31. A system for dispensing a curable composition formed by a mixture of first and second materials, comprising:
- a first mixing device;
- means for supplying the first and second materials from respective reservoirs to said first mixing device for mixture therein to form the composition;
- means for selectively coupling the composition for flow from said first mixing device to a dispensing nozzle for dispensing of the composition;
- a second mixing device;
- means for selectively supplying the composition to said second mixing device;
- means for supplying a diluent stream of the first material to said second mixing device in sufficient quantity for mixture therein with the composition supplied thereto to form a diluted mixture having a sufficiently low concentration level of the second material to prevent curing of the diluted mixture for a substantial period of time; and
- a valve block having said first and second mixing devices connected thereto, and having an opening formed therein defining said dispensing nozzle, said valve block further including an internal flow passage communicating between said first and second mixing devices and with said dispensing nozzle, said coupling means comprising a dispensing valve for selectively opening and closing said dispensing nozzle, and said means for supplying the composition to said second mixing device comprising a bypass valve positioned to open and close said flow passage at a position downstream of said dispensing valve, said valve block further including an inlet port for passage of said diluent stream into said flow passage at a position downstream of said bypass valve.

32. The system of claim 31 wherein the length of said flow passage between said first mixing device and said dispensing valve is relatively short.

33. The system of claim 31 wherein the length of said flow passage between said dispensing valve and said bypass valve is relatively short.

34. The system of claim 31 wherein the length of said flow passage between said bypass valve and said second mixing device is relatively short.

35. The system of claim 31 wherein substantially the entire volume of said flow passage is swept by the composition flowing therethrough when said dispensing valve is closed and said bypass valve is open.

36. The system of claim 31 wherein substantially the entire volume of said inlet port and the portion of said flow passage downstream of said bypass valve is swept by said diluent stream.

37. A system for dispensing a curable composition formed by a mixture of first and second materials, comprising:
- a first mixer;
- means for supplying a metered quantity of the first material from a first reservoir to said first mixer;
- means for supplying a metered quantity of the second material from a second reservoir to said first mixer for mixture with the first material to form the composition, and including means halting said supply of second material and for returning the metered quantity of the second material to said second reservoir;
- dispensing means including a dispensing nozzle for dispensing the composition from said first mixer during one condition of operation;
- a second mixer;
- bypass means for bypassing said dispensing means in a second condition of operation and for supplying the composition from said first mixer to said second mixer during a second condition of operation; and
- means for supplying a diluent stream of the first material to said second mixer in sufficient quantity for mixture therein with the composition supplied to said second mixer to form a diluted mixture having a sufficiently low concentration level of the second material to prevent curing of the diluted mixture for a substantial period of time.

38. The system of claim 37 including means for returning the diluted mixture to said reservoir for the first material.

39. A system for dispensing a curable composition formed by a mixture of first and second materials, comprising:
- means for suppying from separate reservoirs and mixing in prescribed ratio the first and second materials to form the curable composition;
- means for dispensing the composition in a first condition of operation;
- means for supplying and mixing the composition in prescribed ratio with a diluent stream of substantially first material in a second condition of operation, said diluent stream being provided in sufficient quantity to form a diluted mixture having a sufficiently low concentration of the second material to prevent curing of the diluted mixture for a substantial period of time; and
- means for supplying the diluted mixture to said reservoir for the first material.

40. The system of claim 39 including means for pumping material from said reservoir of first material to form said diluent stream.

41. A system for dispensing a curable composition formed by a mixture of first and second materials, comprising:
- means for supplying in prescribed ratio the first and second material from separate reservoirs to a mixer for mixture therein to form the composition;
- means for dispensing the composition in a first condition of operation; and
- means for supplying and mixing the composition in prescribed ratio with a diluent stream of substantially first material in a second condition of operation, said diluent stream being provided in sufficient quantity to form a diluted mixture having a sufficiently low concentration of the second material to prevent curing of the diluted mixture for a substantial period of time;
- means for flushing composition from said mixer in a third condition of operation, said flushing means including means for halting supply of the second material and for continuing supply of the first material to said mixer, and means for coupling the flow of composition and the first material with said diluent stream, said diluent stream being provided in sufficient quantity to form a diluted mixture having a sufficiently low concentration of the second material to prevent curing of the diluted mixture for a substantial period of time; and
- means for returning the diluted mixture formed in said second and third conditions of operation to said reservoir of the first material.

42. A method of dispensing a curable composition formed by a mixture of first and second materials, comprising the steps of:
- supplying from separate reservoirs and mixing the first and second material in a prescribed ratio;
- dispensing the composition in a first condition of operation; and
- diluting the composition in a second condition of operation by mixing the composition with a diluent stream formed substantially by the first material in sufficient quantity to form a diluted mixture having a sufficiently low concentration of the second material to prevent curing of the diluted mixture for a substantial period of time and returning the diluted mixture to the reservoir of the first material.

* * * * *